Dec. 22, 1925.
C. A. McCOURT
1,566,755
METHOD AND APPARATUS FOR TREATING ORES
Filed Jan. 12, 1924     3 Sheets-Sheet 3
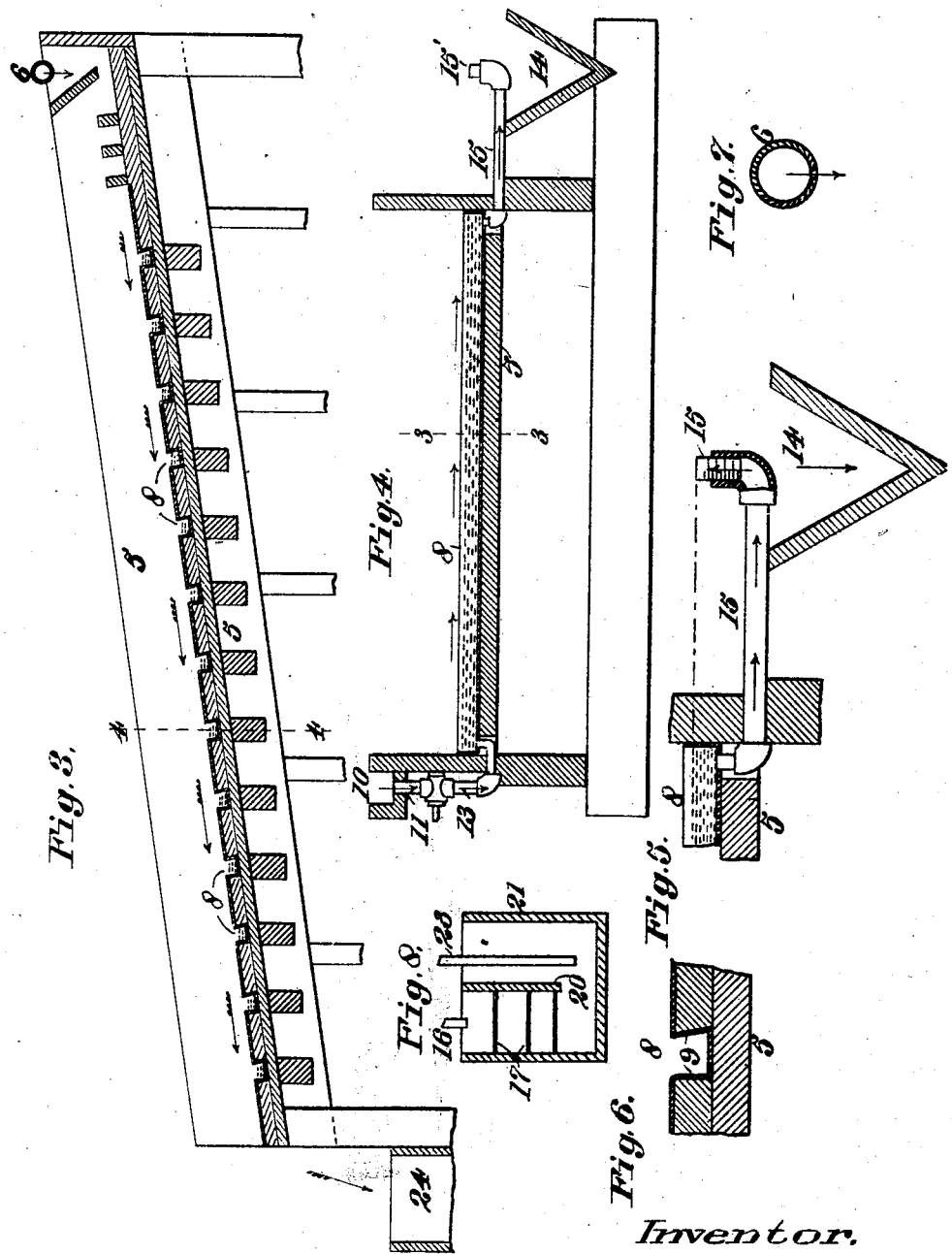

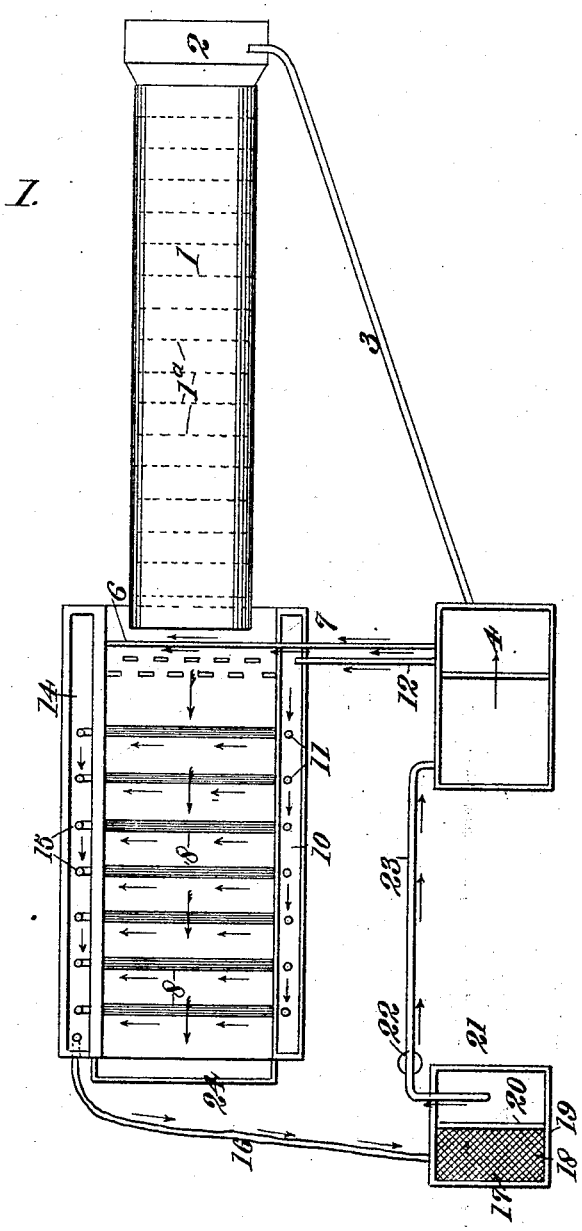

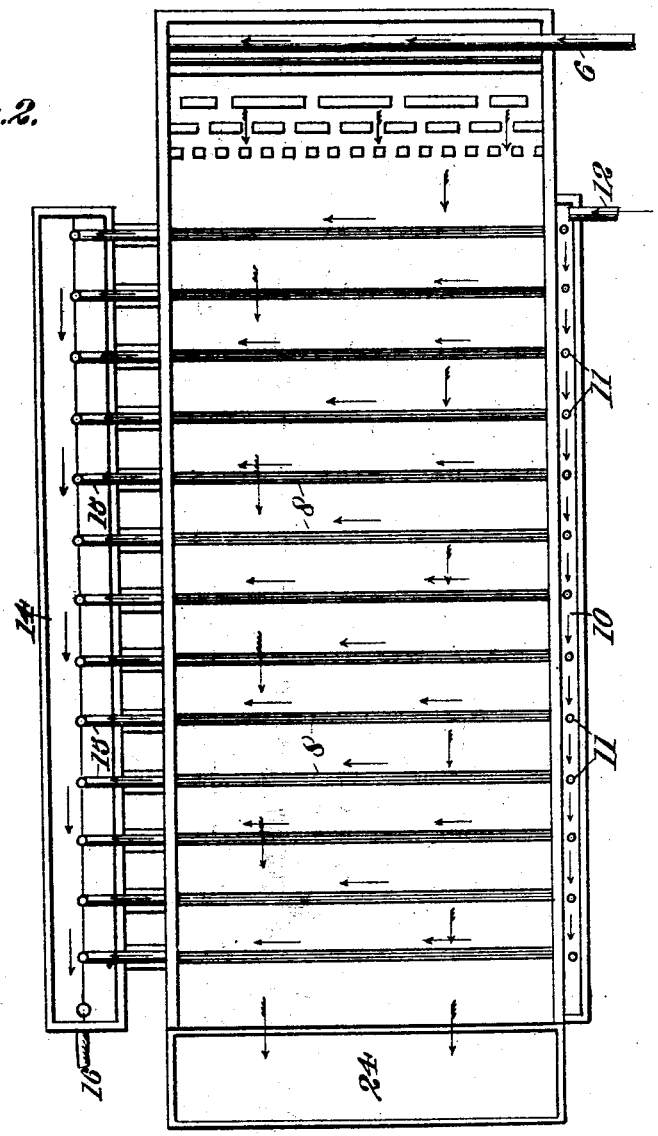

Patented Dec. 22, 1925.

1,566,755

UNITED STATES PATENT OFFICE.

CHARLES A. McCOURT, OF OAKLAND, CALIFORNIA.

METHOD AND APPARATUS FOR TREATING ORES.

Application filed January 12, 1924. Serial No. 685,790.

*To all whom it may concern:*

Be it known that I, CHARLES A. McCOURT, a citizen of the United States, residing at Oakland, in the county of Alameda and State of California, have invented certain new and useful Improvements in Methods and Apparatus for Treating Ores, of which the following is a specification.

The hereinafter described invention relates to a method and apparatus for the recovery of values, such as gold and silver from ores, and the object of the invention is essentially to recover the lighter values which at present in the use of concentrators or amalgamating devices are lost by being carried away with the tailings or gangue discharging therefrom.

The method invention resides in subjecting the pulverized value-bearing ores which are fed to the apparatus in the form of slimes or pulp to the action of a plurality of streams of an amalgamating solution while the slimes or pulp is maintained flowing over amalgamating surfaces, the solution employed in the treatment of the said slimes or pulp being known as sodium amalgam. For use in the method invention there is provided an electrolytic cell interposed within the path of circulation of the mercury solution or sodium amalgam and from said electrolytic cell a plurality of streams of solution are withdrawn and at different points in the path of travel of the flowing slimes or pulp ejected thereonto for intermingling therewith and causing a separation of the values carried thereby. For convenience, the charged mercury solution flowing from the electrolytic cell shall hereinafter be referred to as a pregnant amalgam solution.

In the carrying out of the method invention the slimes or pulp to be treated is discharged primarily into a downwardly inclined rotary cylinder having an inner amalgamating surface lining and as delivered into the said cylinder the said slimes are subjected to the action of a stream of the pregnant solution discharged thereonto and which during the course of travel of the slimes through the rotating cylinder element of the apparatus causes an amalgamation to a certain extent of the lighter values carried by the slimes. The slimes with values contained therein as discharged from the rotating cylinder fall onto and are caused to travel in a downwardly direction over an amalgamating table, which is provided with transversely disposed riffles and amalgamating plates. As the slimes enter upon the amalgamating table they are subjected to the action of jet streams of the pregnant solution, which act by amalgamation to recover certain of the lighter values from the flowing stream of slimes, such of the heavier values as are not recovered on the pregnant solution settling by gravity and recovered by the amalgamating plates of the amalgamating table. However, there are certain light values which during the course of the flow of the slimes will not by gravity separate and be deposited onto the amalgamating surfaces of the concentrating table and these lighter values are subjected to the action of transversely flowing streams of the pregnant solution, which serve to cause an amalgamation thereof and prevent the loss which otherwise would occur by being carried away with the tailings discharging from the amalgamating table. The pregnant solution with such recovered values as are carried thereby is delivered into a settling chamber having a series of superposed amalgamating screens arranged therein which catch or recover the excess amalgam carried by the flowing stream of the solution entering within the recovery compartment of the settling chamber, the solution passing through the collecting screens being returned to the electrolytic cell for recharging.

The method invention is a continuous one and there is no waste of mercury in the carrying out thereof.

Referring to the accompanying drawings wherein is illustrated an efficient, practical and operative apparatus for the carrying out of the method invention—

Fig. 1 is a plan view of the apparatus, the rotary cylinder thereof being partly broken away.

Fig. 2 is a plan view of the amalgamating table of the apparatus, disclosing the transversely disposed riffles therein and the longitudinally disposed sluice-ways arranged at the sides thereof for maintaining a flow of the pregnant solution into and from the riffles of the said table.

Fig. 3 is a longitudinal sectional view taken on the line 3—3, Fig. 4 of the drawings.

Fig. 4 is a tranverse sectional view taken on the line 4—4, Fig. 3 of the drawings.

Fig. 5 is a detailed sectional view disclosing the means for maintaining a level of the pregnant solution within the riffles of the amalgamating table.

Fig. 6 is a fragmentary sectional view taken through one of the riffles of the concentrating table.

Fig. 7 is an enlarged sectional view of the spray pipe for discharging jets of pregnant amalgamating solution onto the slimes as delivered to the head end of the amalgamating table.

Fig. 8 is a vertical sectional view of the settling chamber for receiving the pregnant solution flowing from the amalgamating table.

In the drawings, the numeral 1 is used to indicate any suitable type of a downwardly inclined rotating cylinder, provided interiorly with an amalgamating surface preferably in the form of a corrugated lining 1ᵃ, the corrugated amalgamating lining being employed to provide a retarded flow of the slimes through the said cylinder. The slimes to be treated as delivered from the ore reducing machinery discharges into the head end of the downwardly inclined rotary cylinder, being guided through a chute or sluice-way 2. Into the upper end of the cylinder 1 extends the discharge end of a pipe 3 leading from an electrolytic cell 4, which cell is preferably situated in a plane raised above that of the cylinder 1 in order that the pregnant solution from the said cell may flow though the pipe 3 into the upper end of the cylinder 1 by gravity, said pregnant solution ejected from the pipe 3 being directed onto the slimes as delivered into the said cylinder. This pregnant solution intermixes with the slimes and causes an amalgamation of a certain proportion of the lighter values contained within the slimes as moved through the cylinder. The slimes discharging from the cylinder and which contain lighter values still to be recovered discharge onto the head portion of the downwardly inclined amalgamating table 5 and as discharged onto the said table encounter jet streams of the pregnant solution directed thereagainst from the perforated spray pipe 6, arranged transversely at the upper end of the said table. This perforated section of the pipe 6 constitutes a continuation of a pipe 7 extended from the electrolytic cell 4. The jets of pregnant solution directed against the body of slimes discharging onto the head end of the table serve to amalgamate certain portions or percentage of the lighter values still contained in the slimes, such as the values which are not recovered by the action of the jets of the pregnant solution being carried with the slimes downwardly over the surface of the amalgamating table and during the flow thereover encounter the transversely disposed riffles 8 formed in the said table and each of which is lined with an amalgamating plate 9.

Onto the surface of the table from sluice-way 10 arranged at one side of the concentrating table 5 pregnant solution is admitted to the respective transversely disposed amalgamating riffles 8 of the table through the outlet openings 11 formed in the bottom of the said sluice-way, the pregnant solution being admitted into the sluice-way 10 from the pipe connection 12 extended from the electrolytic cell 4 and which cell is preferably of the Whiting type. The connection between the discharge outlets 11 of the sluice-way 10 and the riffles of the amalgamating table being through the medium of valve controlled pipe connections 13, Fig. 4 of the drawings. Such of the heavier particles of the values to be recovered as settle with the riffles of the concentrating table adhere to the amalgamating lining 9, but the lighter or floating portions thereof amalgamate with and are carried by the flowing streams of the pregnant solution and discharged into the sluice-way 14 arranged at the opposite side of the amalgamating table to that of the sluice-way 10 and as will be noticed by Fig. 4 of the drawings the sluice-way 14 is situated in a plane below that of the sluice-way 10. The solution flowing from the riffles of the amalgamating bed is conveyed to the sluice-way 14 through the medium of a series of flow pipes 15, the free end of each flow pipe being turned upwardly a given distance and provided with an outlet controlling nozzle 15′. The upward turn or extension of the pipes 15 is such as to maintain a flow level in the riffles 8 of a given depth. The pregnant solution flowing through the riffles 8 and therefrom by means of the overflow pipes 15 into the downwardly extended sluice-way 14 discharges therefrom through the pipe 16 into a settling chamber 17. Inasmuch as this solution carries in amalgamation form the lighter particles of value recovered from the slimes flowing over the amalgamating table 5, it is required to separate the amalgamation from the solution flowing into the chamber 17 and for this purpose the solution is delivered onto the uppermost of a series of amalgamating screens 18, arranged in superposed relation in the compartment 19 of the settling chamber and which is formed by the partition wall 20 arranged therein. This partition wall does not extend entirely to the bottom of the settling chamber 17, so that the free liquor passing from the bottommost of the superposed amalgamating screens 18 flows into the compartment 21 of said settling chamber and is withdrawn therefrom by means of a suction pump 22 interposed within the withdrawal pipe 23, one end of which is extended into the compartment 21 and the opposite end of which is connected with the electrolytic cell 4. The weakened solution is thus returned to the electrolytic cell for a recharge thereof and for a flow therefrom through the beforementioned pipes 3, 7 and 12 respectively, into the cylinder 1, onto the slimes discharging therefrom onto the head portion of the amalgamating table and into the sluice-way 10. The tailings overflowing the said table discharge into a suitable discharge runway 24.

By use of the described apparatus it will be noted that at all times during the treatment of the slimed ore for the recovery of values therefrom, the same is subjected to the action of flowing streams of a pregnant amalgamating solution for the recovery or separation of the lighter values, while the heavier values contained therein settle out by gravity, during the course of the flow of the slimes onto the amalgamating lining associated with the rotating cylinder and the amalgamating table plate covering of the table 5, so that the tailings discharge from the apparatus freed of the values or at least the loss of value is reduced to a minimum and is a non-appreciable one.

In the method as practised and carried out by the described apparatus, the flowing stream or body of slimed ore is treated at stages successively with the pregnant solution, the initial treatment for the settling out of the major portion of the heavier values taking place in the rotating amalgamating cylinder, the slimes thus being freed in the main of the heavier values when delivered to the head end of the amalgamating table, there being subjected to a second action of the pregnant solution for a removal or amalgamation therewith of lighter value contents thereof. The slime flowing over the said table after passing from within the sphere of said jets of pregnant solution encounter the series of streams of the pregnant solution flowing through the transversely disposed riffles of the amalgamating table, so that such portion of the values to be recovered as do not settle upon the amalgamating surface 9 of the said table are carried off as floating values by the streams of the pregnant solution passing through the riffles into the collecting or settling receptacle 17 and the amalgamated values retained and separated from the solution as the same passes through the superposed amalgamating screens 18 arranged in one compartment thereof, the said solution then being returned to the electrolytic cell for re-charging. By this method there is no loss of the mercury carried within the solution for the amalgamation of the lighter values contained within the slimes, for the amalgamated values recovered from the said slimes are separated from the solution as passed through the superposed screens situated within the settling chamber.

I have thus provided what may be termed a closed path of circulation for the mercury or pregnant solution for application thereto onto the slimes undergoing treatment in stages and from the solution the amalgamated values are recovered prior to a return of the solution to the electrolytic cell for recharging thereof. During the initial treatment of the slimes or while passing through the rotary cylinder 4 the corrugated amalgamated lining 2 retards or slows down the flow of the slimes and thus not only gives an opportunity for the heavier values to settle out and adhere to the amalgamated lining of said cylinder, but permits the pregnant solution to thoroughly intermingle with the slimes for aiding and assisting in the amalgamation of the values, the said slimes during such treatment being maintained in a condition of agitation through the rotary action of the cylinder 1. Such of the heavier values as are not recovered within the said cylinder 1 settle out and are recovered by the amalgamating plate covering 9 during the flow of the slimes over the amalgamating table 5.

Having thus described my invention, what I claim as new and desire to secure by Letters Patent, is:

1. The method of recovering the lighter values from mineral value-bearing slimes, which comprises providing a continuous flow of an amalgamating solution through an electrolytic cell, diverting streams of said solution flowing from the said cell onto the slimes at separated points during the course of the flow travel thereof for the recovery of the lighter values therefrom, separating the amalgamated values from said pregnant solution, and returning the spent liquor to the electrolytic cell for recharging.

2. An apparatus for the recovery of values from mineral value-bearing slimes, the same comprising an amalgamating table over which the slimes are flowed, means for maintaining a continuous flow of an amalgamating solution through an electrolytic cell, means for diverting independent streams of the pregnant solution passing from the cell and directing the same at different points onto the slimes as flowed over the amalgamating table for a recovery of the lighter values therefrom, devices for collecting the amalgamated values from said solution, and means for returning the spent liquor to the electrolytic cell for recharging.

3. An apparatus for the recovery of values from mineral value-bearing slimes, the same comprising a rotating amalgamating cylinder through which the slimes are passed, an amalgamating table for receiving the slimes discharged from the said cylinder, means for maintaining a continuous flow of an amalgamating solution through an electrolytic cell, means for directing a stream of the said solution onto the slimes as fed into the cylinder and as delivered from the cylinder onto the table and a plurality of said streams onto the amalgamating table at separated points for the recovery of the lighter mineral values from the slimes, devices for directing the said liquor with the value recoveries contained therein to a collecting chamber for the separation of the recoveries therefrom, and means for delivering the spent liquor from said chamber to the electrolytic cell for a re-charging thereof.

In testimony whereof I have signed my name to this specification.

CHARLES A. McCOURT.